United States Patent [19]

McMillen

[11] 4,214,422
[45] Jul. 29, 1980

[54] FORAGE HARVESTER WITH ADJUSTABLE CROP GUIDANCE APPARATUS

[75] Inventor: Kenneth R. McMillen, Canton, Kans.

[73] Assignee: Hesston Corporation, Hesston, Kans.

[21] Appl. No.: 959,563

[22] Filed: Nov. 13, 1978

[51] Int. Cl.² ........................................... A01D 45/02
[52] U.S. Cl. ....................................... 56/119; 56/51
[58] Field of Search .................. 56/51, 53, 119, 14.3

[56] References Cited

U.S. PATENT DOCUMENTS

| | | | |
|---|---|---|---|
| 3,018,601 | 1/1962 | Griffin et al. | 56/119 |
| 3,126,691 | 3/1964 | Krahn et al. | 56/119 |
| 3,139,718 | 7/1964 | Rickerd et al. | 56/119 |
| 3,462,922 | 8/1969 | Phillips et al. | 56/14.3 |
| 3,623,298 | 11/1971 | Hitzhusen | 56/2 |
| 3,796,029 | 3/1974 | Weigand et al. | 56/119 |

*Primary Examiner*—Russell R. Kinsey
*Attorney, Agent, or Firm*—Schmidt, Johnson, Hovey & Williams

[57] ABSTRACT

Gathering conveyors of the forage harvesting header deliver upstanding, severed crop stalks by their lower ends to an outlet toward which all conveyors of the header converge. The upper ends of the crop stalks are guided and gathered laterally inwardly by apparatus above the conveyors, and a transversely disposed knock-down bar just forwardly of the outlet leans the stalks back toward the front end of the header as they approach the outlet so that the stalks tend to enter and pass through the outlet in a butt-first condition. The knock-down bar is mounted so as to yield upwardly under the influence of crops passing therebeneath in the event that the volume of the crops is so great that they could otherwise not pass through the restriction formed by the knock-down bar on the one hand and the conveyors on the other hand. The knock-down bar forms part of a generally U-shaped lower guiding unit pivoted at its front end to a similarly U-shaped upper guiding unit, both of which are adjustably mounted on the header in such a way that various adjustments can be made to accommodate tall, short and light or dense crops without adversely affecting performance of the knock-down bar.

11 Claims, 8 Drawing Figures

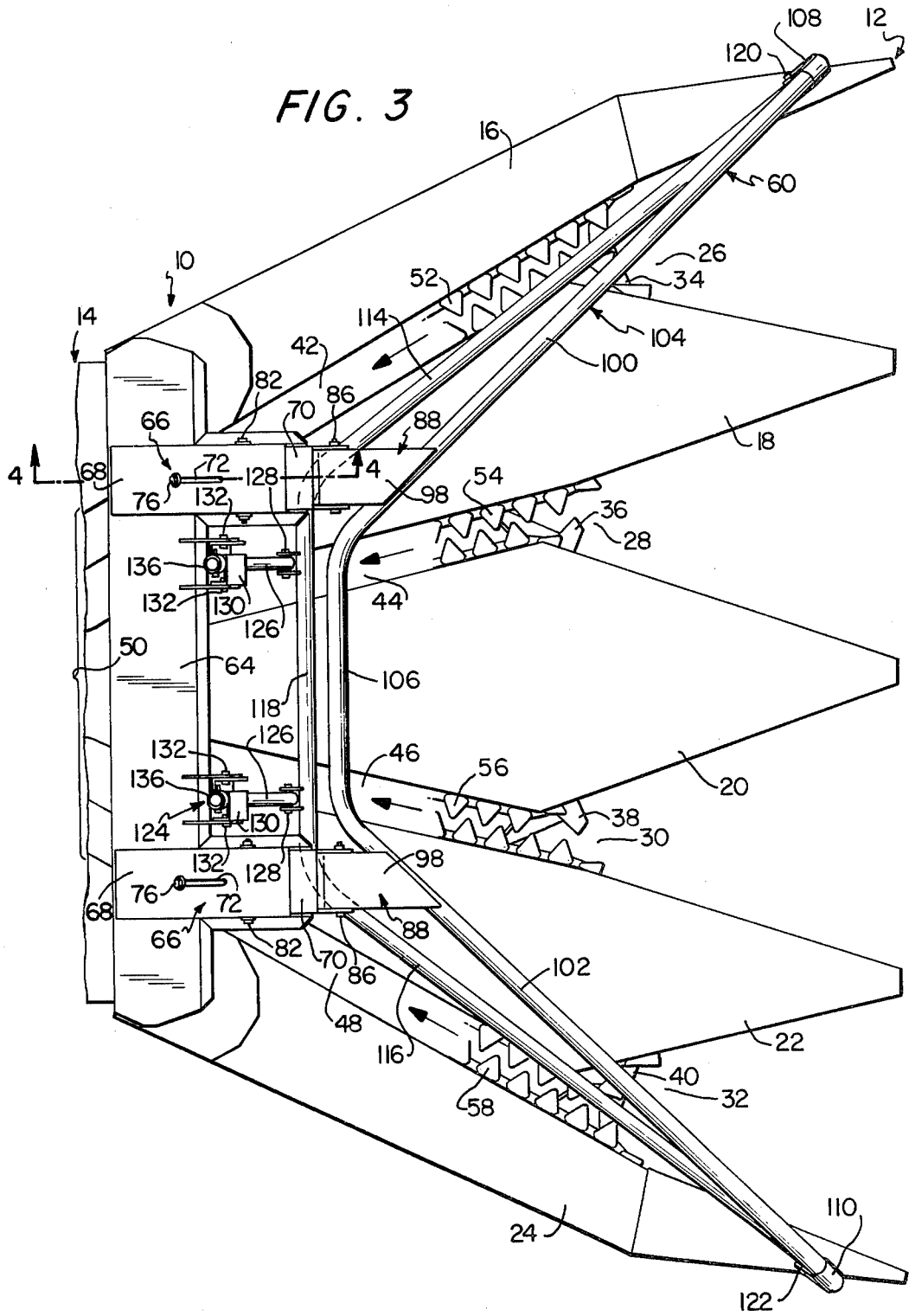

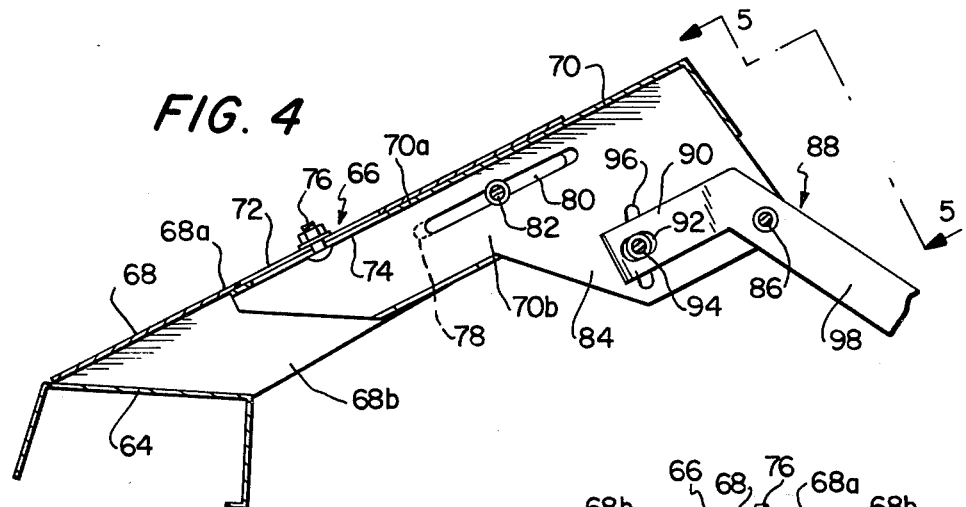
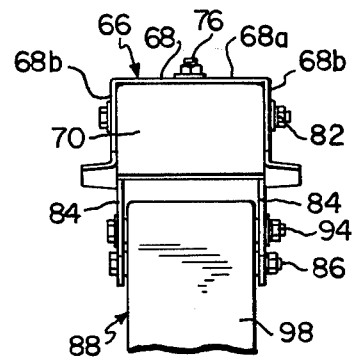
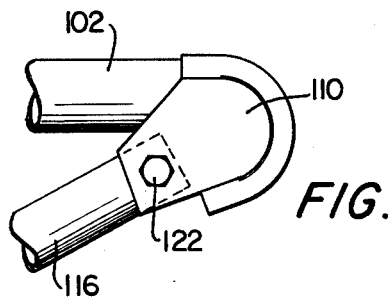
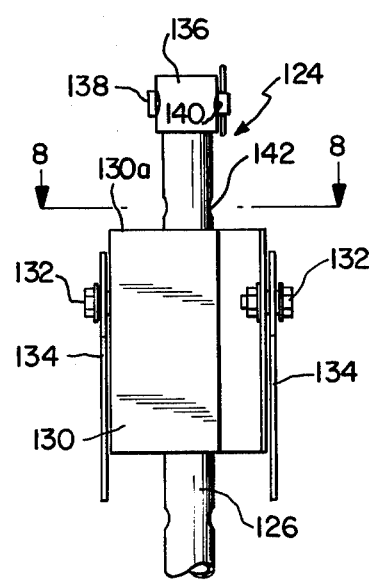
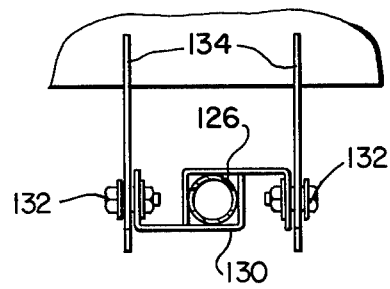

FORAGE HARVESTER WITH ADJUSTABLE CROP GUIDANCE APPARATUS

TECHNICAL FIELD

This invention relates to the field of crop harvesting and, more particularly, to improvements in the way in which the crops are handled immediately following severance from the ground and during the period that divergent rows of the crops are gathered together as they are fed to a point of processing.

BACKGROUND ART

"Low profile" forage harvesters employing only a single level of gathering conveyors to transport the severed crop stalks upwardly and rearwardly into the chopper are typically provided with overhead crop guidance structure of one form or another to assist in controlling the tops of the stalks while the lower ends are controlled by the conveyors. Although the conveyors converge the lower ends of the stalks laterally so as to facilitate delivery through a common outlet into the chopper, some overhead assistance is required by guidance structure to force the tops of the stalks to likewise converge laterally for passage through the outlet. Typically also, conventional harvesters are provided with so-called "knock-down bars" or "lean bars" which engage the standing crop stalks as they move toward the outlet and lean the stalks back toward the front of the harvesting header so that the butts of the stalks become presented to the outlet. Hence, delivery of the stalks through the outlet is in a butt-first condition so that the stalks can then be chopped accurately into countless, rather short segments by the chopping mechanism.

While in principle currently available overhead guidance apparatus of the aforementioned type is adequate, it is largely designed for use in uniform, unchanging crop conditions, e.g., crop stalks of uniformly one height, diameter, leafiness, fruit yield, etc. In reality, however, the harvesting operator frequently encounters variations from field-to-field and regions of varying crop conditions in each individual field being harvested. Thus, constructing the guidance apparatus according to preestablished specifications based upon an "average" yield and, an "average" stalk height dooms the apparatus to inefficient operation and, conceivably, to complete operational shutdown, if the crops actually being harvested vary substantially from the preestablished norm.

Accordingly, preadjustment of the guidance apparatus based upon the harvesting operator's analysis of conditions in a particular field is very desirable. But that alone is insufficient because the guidance apparatus still needs the ability to "self-adjust" to a certain degree when encountering substantial changes in crop conditions within the same field. To date, this ability has simply not existed.

SUMMARY OF THE INVENTION

In view of the foregoing, one important object of the present invention is to provide crop guidance apparatus, in conjunction with subordinately disposed conveying mechanism, that includes what may be termed a "floating" knock-down bar which may be preset to accommodate even the shortest crop stalks likely to be encountered in any particular field and yet which can float or yield upwardly under the influence of heavy, incoming volumes of crop stalks if indeed such yielding is necessary to permit the heavier and bulkier stalks to pass under the knock-down bar and thence through the outlet therebehind.

In carrying out the foregoing objective, it is important that the ability of the knock-down bar to yield in this manner not be compromised simply because the guidance apparatus might be adjusted in certain other respects calculated to improve the control exercised by the apparatus over incoming crop materials. Thus, the present invention resides not only in the way in which the knock-down bar is floatingly mounted for the aforementioned yielding movement, but also to the way in which it interrelates to the other components of the guidance apparatus with their various adjustment capabilities.

BRIEF DESCRIPTION OF THE DRAWINGS

FIG. 3 is a plan view of the harvesting header and guidance apparatus of FIG. 1 taken substantially along line 3—3 thereof;

FIG. 4 is an enlarged, fragmentary, vertical cross sectional view, taken substantially along line 4—4 of FIG. 3, of the means by which the guidance apparatus is mounted on to the header; and is rendered adjustable relative thereto;

FIG. 5 is a fragmentary end view of the components of FIG. 4 taken substantially along line 5—5 of FIG. 4;

FIG. 6 is an enlarged, fragmentary detail view of one of the junctions between an upper guidance unit and the lower guidance unit;

FIG. 7 is an enlarged, fragmentary detail view of components associated with the floating feature of the knock-down bar; and FIG. 8 is a transverse cross sectional view of the components shown in FIG. 7 taken substantially along line 8—8 thereof.

DETAILED DESCRIPTION

Figure 1:
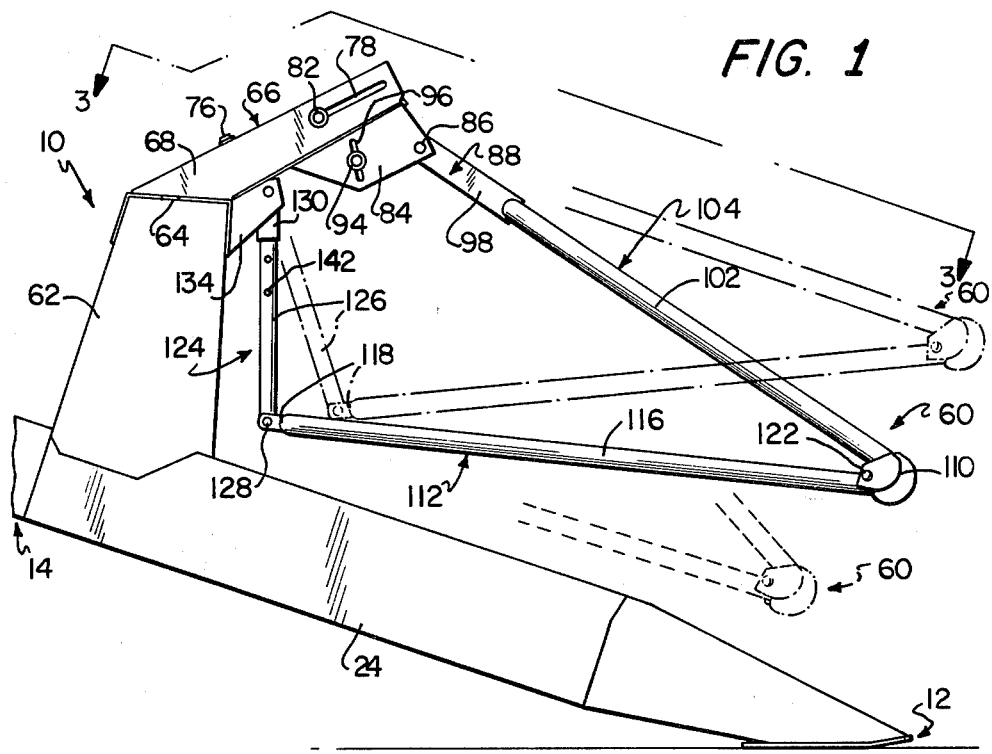
FIG. 1 is a schematic, somewhat fragmentary side elevational view of a crop harvesting header employing guidance apparatus constructed in accordance with the principles of the present invention.
Figure 2:
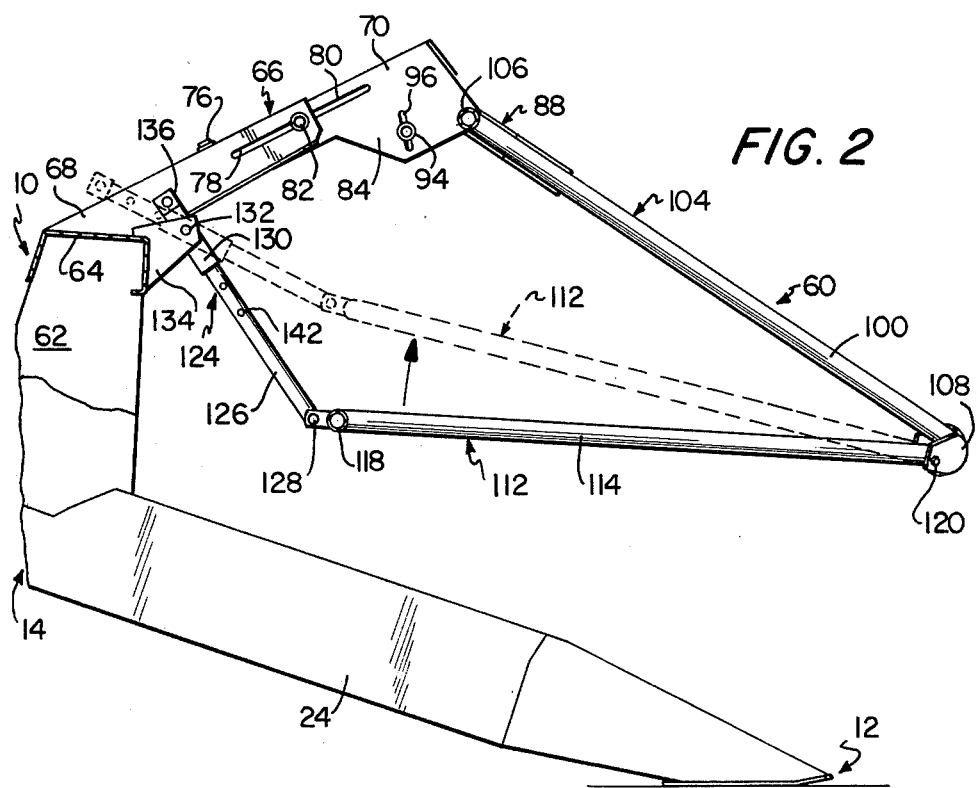
FIG. 2 is a fragmentary, vertical cross sectional view of the forage harvesting header of FIG. 1 taken substantially centrally thereof and illustrating the guidance apparatus in an upwardly and forwardly adjusted condition relative to that shown in FIG. 1.

As shown in FIGS. 1, 2 and 3, the header 10, designed for attachment to the front end of a self-propelled vehicle (not shown) or to the towing frame of a pull-type implement (not shown), has a front end 12 and a rear end 14. A plurality of generally fore-and-aft extending, laterally spaced apart snouts 16, 18, 20, 22 and 24 have row crop inlets 26, 28, 30 and 32 defined therebetween across the front end 12 of the header 10 for receiving standing crops as the header 10 is advanced across a field. Suitable cutter means, here shown as a rotary type and identified by the numerals 34, 36, 38, and 40 are located in respective ones of the inlets 26, 28, 30 and 32 for severing the standing crops as they enter such inlets. As noted particularly in FIGS. 1 and 2, the header 10 is inclined downwardly and forwardly such that the cutters 34, 36, 38 and 40 are located fairly close to the ground.

Crop passages 42, 44, 46 and 48 defined between the laterally spaced snouts 16–24 lead upwardly and rearwardly from the inlets 26–32 and converge rearwardly toward a common outlet 50 rearwardly beyond which is normally located mechanism for feeding the crop stalks into a suitable chopper. Conveyors 52–58 in respective ones of the passages 42–48 grip the severed crop stalks adjacent their lower ends and transport the same in a generally upstanding condition rearwardly through the passages 42–48 to and through the outlet 50.

Apparatus denoted generally by the numeral 60 is located above the conveyors 52–58 in disposition for controlling the tops of crop stalks as the latter are moved upwardly and rearwardly by the conveyors 52–58. Such apparatus 60 is supported in a cantilever fashion adjacent the rear end 14 of the header 10 by structure including a pair of uprights 62 on opposite lateral sides of the outlet 50 and a crosshead 64 spanning the uprights 62 above the outlet 50. A pair of inverted, generally U-shaped, telescoping arms 66 extend upwardly and forwardly from the crosshead 64 adjacent opposite ends of the latter, each of said arms 66 including an outer section 68 rigid to the crosshead 64 and an inner section 70 slidably and telescopingly received within the outer section 68 for extension and retraction between the two extreme positions of FIGS. 1 and 2. Aligned slots 72 and 74 in the upper walls 68a and 70a of the sections 68 and 70 respectively receive a releasable fastener in the form of a bolt 76 for retaining the sections 68 and 70 in any selected one of a number of extensible positions thereof. Similarly, aligned slots 78 and 80 in corresponding sidewalls 68b and 70b of the sections 68 and 70 respectively receive a releasable fastener in the form of a bolt 82 for assisting the bolt 76 in holding the arms 66 in a selected position of extension or retraction.

Each of the inner sections 70 is provided with a pair of laterally spaced apart, depending support lugs 84 spanned by a pivot member 86. An inverted, generally L-shaped bracket 88 (see FIG. 4 for the L-shaped configuration) is carried on the pivot member 86 for vertical swinging movement about the transverse axis defined by the pivot member 86. Each of the brackets 88 has an inner, short leg 90 thereof received within the space between the lugs 84, and the leg 90 is provided with an elongated opening 92 that receives a releasable retainer in the nature of a bolt 94 spanning the distance between the two lugs 84. An essentially vertically extending slot 96 in each of the lugs 84 allows the bolt 94 to move up and down relative to the lugs 84 when bolt 94 is released, thereby likewise permitting the aforementioned vertical swinging movement of the bracket 88. As is apparent, the bolt 94 thus operates as a means for releasably securing the corresponding bracket 88 in any one of a number of selected vertical positions.

The two brackets 88 have their longer legs 98 projecting downwardly and forwardly from the pivot member 86, and at the outer ends of the legs 98, the brackets 88 are rigidly secured to corresponding left and right guide members 100 and 102 forming part of an upper, generally U-shaped guide unit 104 which, in turn, forms part of the guide apparatus 60 best shown in FIG. 3, the upper guides 100 and 102 at their forwardmost ends are disposed slightly laterally outboard of the inlets 26 and 32. However, the angle of convergence of the guides 100 and 102 is such that the guide 100 obliquely traverses the inlet 26 and remains inboard of the passage 42 for the full length of the guide 100, the latter just intersecting the passage 44 at the point where the guide 100 becomes connected to the bight 106. Likewise, the guide 102 obliquely traverses the inlet 32 and from that point rearwardly remains inboard of the passage 48. At its rearmost end, the guide 102 just begins to intersect the plane of the passage 46 whereupon it is connected to one end of transverse bight 106.

The forward ends of the upper guides 100, 102 have junctions 108 and 110 respectively with a lower, generally U-shaped guide unit 112 also forming a part of the guide apparatus 60. The lower unit 112 includes left and right guides 114 and 116 respectively interconnected integrally at their rear ends by a knock-down bar 118 forming the bight of the U-shaped lower guide unit 112. The knock-down bar 118 traverses both of the inner passages 44 and 46 and is slightly longer in both lateral directions than the bight 106 of upper unit 104. Thus, the lower guides 114 and 116 converge slightly less rapidly to their bight (bar 118) than do the upper guides 100, 102 to their bight 106, yet more rapidly than the rate of mutual convergence of the passages 42 and 48.

The lower unit 112 is provided with generally transversely disposed pivot member 120 and 122 at the junctions 108 and 110 respectively which adapt the unit 112 for vertical swinging movement relative to the upper unit 104 such as between the solid and phantom line positions illustrated in FIG. 2. Thus, the knock-down bar 118 is likewise adapted for vertical swinging movement.

Adjacent the rear ends of the guides 114, 116 and more specifically at the knock-down bar 118, is provided linkage broadly denoted by the numeral 124 that attaches the knock-down bar 118 to the crosshead 64 in such a way as to positively limit downward swinging of the bar 118 but permit free upward swinging movement of the bar 118 to an extent that is sufficient to serve the purpose herein intended. To this end, the linkage 124 includes a pair of tubular links 126 at longitudinally spaced locations along the crosshead 64 extending in parallelism from the latter to a pair of pivotal connections 128 with the knock-down bar 118 at spaced locations along the latter. Each of the tubes 126 is slidably received within a corresponding sleeve 130 adjacent the upper end of the tube 126, the sleeve 130 in turn being adapted for up and down swiveling movement by a pair of aligned trunnions 132 supported on a pair of mounting ears 134 rigidly affixed to the crosshead 64.

By virtue of the telescoping relationship of the tubes 126 and their sleeves 130, the linkage 124 is rendered extendible and retractable so as to vary the effective length thereof. Collars 136 (FIG. 7) slipped onto the uppermost ends of the pipes 126 and held in any selected one of a number of positions along the same by removable pins 138 passing through aligned holes 140 and 142 serve as adjustable stop means for preventing the links 126 from projecting downwardly through the sleeves 130 beyond a certain selected amount extension of the links 126 beyond a certain length. As noted, the collars 136 are always disposed on that side of the sleeves 130 opposite the pivotal connections 128 so that the collars 136 may bear against the proximal end 130a of the sleeves 130 to carry out their limiting functions. When such engagement occurs, this, of course, corresponds to the lowered position of the knock-down bar 118 as shown, for example, in solid lines in FIG. 2.

As the header 10 with the apparatus 60 attached is advanced across a field, the rows of standing crops enter the inlets 26, 28, 30 and 32 as earlier mentioned, are severed by the cutters 34, 36, 38 and 40 adjacent the lower ends of the stalks, and are then conveyed upwardly and rearwardly toward the outlet 50 by the conveyors 52, 54, 56 and 58 operating within the passages 42, 44, 46, and 48. As the stalks enter the inlets 26–32, their upper ends are immediately engaged by the guide apparatus 60, even before severance occurs. Hence, at that early point in the operation, the stalks begin to be controlled by the apparatus 60.

With respect to the outer two crop rows moving through the passages 42 and 48, it will be recognized from FIG. 3 that because the upper and lower guides 100, 102 and 114, 116 respectively converge more rapidly than the passages 42, 48, the stalks moving in such passages are gathered laterally inwardly at their tops during upward and rearward conveyance. The action in the center rows corresponding to the passages 44 and 46 is not so dramatic at this time inasmuch as such stalks are inboard of the guides 100, 102 and 114, 116. However, inasmuch as stalks of the outer rows are "folding" inwardly toward the center of the machine, this has somewhat of a tendency to likewise pull the inner two rows over one another due to the pressure exerted inwardly by the outer folding rows.

By the time the knock-down bar 118 is reached by the crop stalks, the outer crop rows in passages 42, 48 are well folded inwardly so that the tops of the stalks are in line laterally with the lateral extremities of the outlet 50, but it is still necessary to orient the stalks endwise for butt-first delivery through the outlet 50 such as to facilitate proper chopping. Hence, as the stalks encounter the knock-down bar 118, their tops are leaned back dramatically toward the front end 12 of the header 10 as their butt ends continue to be conveyed toward the outlet 50. Thus, if the stalks are to enter and pass through the outlet 50, they have no choice but to do so in a butt-first orientation forced upon them by the knock-down bar 118.

It is not an infrequent occurance that crop conditions might vary dramatically within any particular field. In certain areas, for example, the stalks may be substantially shorter than those in other portions of the same field. Hence, it becomes important, in order to feed all stalks butt first through the outlet 50, that the knock-down bar 118 be set low enough to operate effectively against even the shortest stalks. Such setting is determined largely by the selected position for the limit collars 136 as above explained. In order to prevent the knock-down bar 118 from inordinately restricting crop flow and causing undue congestion when it is at the low position, the bar 118 is designed to yield upwardly to the extent required to pass the volume of crop materials attempting to move therebeneath. As is apparent, however, such yielding movement by the knock-down bar 118 is never so much as to completely space the bar 118 above the moving crops and thereby eliminate the ability of bar 118 to lean back the crops since it is the crops themselves which "operate" the bar 118 and only then to the extent necessary to facilitate passage therebeneath. It is contemplated that the weight of the lower unit 112 should in and of itself be sufficient to maintain the knock-down bar 118 biased yieldably downwardly into proper operating position, but such force could be supplemented if necessary by the addition of suitable spring means (not shown).

By virtue of the telescopic relationship between the links 126 and the sleeves 130, the knock-down bar 118 can always swing up as may be required to prevent jam up of crops moving toward the outlet 50, and yet the knock-down bar 118 will be assured of always returning to its lower position selected by the location of the collars 136 along the tubes 126.

It may also be necessary from time to time to make certain other adjustments of the guide apparatus 60, and these may be readily carried out without compromising the effective operation of the "floating" knock-down bar 118. Thus, as shown, for example, in FIG. 1, the vertical position of the forwardmost tips of the apparatus 60 may be raised or lowered by loosening the fasteners 94 and swinging the tips upward or downward as may be desired to the selected postion, whereupon the fasteners 94 are resecured so as to firmly hold the tips in the selected position. This has no effect on the yieldability of the knock-down bar 118 as is apparent.

As illustrated in FIG. 2, the tips of the apparatus 60 may be displaced in a fore-and-aft direction as a result of the telescoping nature of the arms 66. Thus, in FIG. 2, the arms 66 are fully extended to their greatest length so as to project the tips of the apparatus 60 slightly beyond the forward end 12 of the header 10. Although this somewhat changes the angle between the lower unit 112 and the linkage 124, and although the height of the knock-down bar 118 is somewhat raised over and above that of FIG. 1, the ability of the knock-down bar 118 to yield upwardly is in no way compromised by such adjustment of the tips. As illustrated in FIG. 2, the knock-down bar 118 is still fully capable of yielding upwardly to the phantom position as the links 126 telescope into the sleeves 130 and the latter swivel about their trunnions 132.

I claim:

1. In combination with a crop harvesting header having means for severing rows of standing crops from the ground as the header is advanced across a field and for conveying the severed crop stalks in rearwardly converging streams toward an outlet, guidance apparatus for the stalks above said conveying means comprising:
   a pair of rearwardly converging, laterally spaced and fore-and-aft extending guides disposed to gather the stalks laterally;
   a knock-down bar adjacent the rear of said guides and transverse to the path of travel of said conveying means in disposition for leaning the stalks back toward the front of the header as they approach said outlet so as to promote butt-first delivery of the stalks through said outlet; and
   means mounting said knock-down bar for yielding movement upwardly away from said conveying means to the extent required by the volume of converging streams of stalks passing beneath the bar.

2. In the combination as claimed in claim 1, wherein said guides and said bar are rigidly interconnected, said guides having a pair of supporting pivots adjacent their forward ends for permitting the guides and said bar to swing as a unit about said pivots during said yielding movement of the bar, said mounting means for the bar including said pivots.

3. In the combination as claimed in claim 2, wherein said mounting means further includes linkage pivotally attached at one end to the header and at the other end to said unit, said linkage being extensible and retractable to accommodate said swinging of the unit and being provided with stop means for limiting extension thereof beyond a certain length corresponding to the lower position of said bar prior to said yielding movement.

4. In the combination as claimed in claim 3, wherein said stop means is adjustable for selectively varying said certain length of the linkage and thereby adjusting said lower position of the bar.

5. In the combination as claimed in claim 1; and a pair of rearwardly converging, laterally spaced and fore-and-aft extending upper guides above the lower, first mentioned guides, said upper and lower guides converging mutually in a vertical direction to a pair of forwardly disposed, laterally spaced junctions.

6. In the combination as claimed in claim 5, wherein said lower guides and said bar are rigidly interconnected, said lower guides being supported at their front ends by a pair of pivots at opposite ones of said junctions for swinging of the lower guides and said bar as a unit about said pivots during said yielding movement of the bar, said mounting means including said pivots.

7. In the combination as claimed in claim 6, wherein said upper guides are provided at their rear ends with means attaching the upper guides to said header for vertical swinging travel so as to raise and lower said junctions, said upper guides at their rear ends further being provided with releasable means for holding the upper guides against said swinging travel in any selected one of a number of vertically disposed positions.

8. In the combination as claimed in claim 6, wherein said upper guides at their rear ends are provided with means attaching said upper guides to the header for upward and forward shifting of said rear ends of the upper guides, said upper guides at their rear ends further being provided with means for releasably securing the upper guides against said shifting in any selected one of a number of upward and forward positions.

9. In the combination as claimed in claim 8, wherein said attaching means are further operable to permit vertical swinging travel of the upper guides about transverse axes adjacent said rear ends thereof, said upper guides being further provided at their rear ends with means for releasably holding the upper guides against said swinging travel in any selected one of a number of vertically disposed positions.

10. In the combination as claimed in claim 9, wherein said mounting means further includes linkage pivotally attached at one end to the header and at the other end to said unit, said linkage being extensible and retractable to accommodate said swinging of the unit and being provided with stop means for limiting extension thereof beyond a certain length corresponding to the lower position of said bar prior to said yielding movement.

11. In the combination as claimed in claim 10, wherein said stop means is adjustable for selectively varying said certain length of the linkage and thereby adjusting said lower position of the bar.

* * * * *